J. A. EDEN, Jr.
UNIVERSAL JOINT.
APPLICATION FILED JAN. 8, 1914.

1,177,766.

Patented Apr. 4, 1916.
2 SHEETS—SHEET 1.

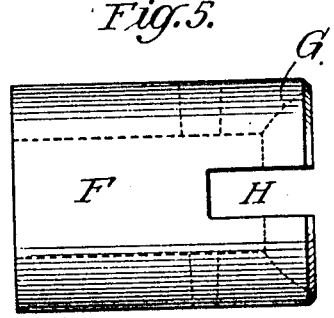
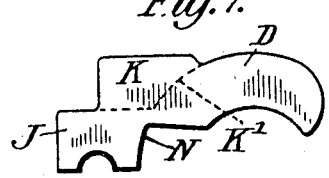
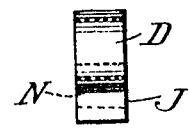
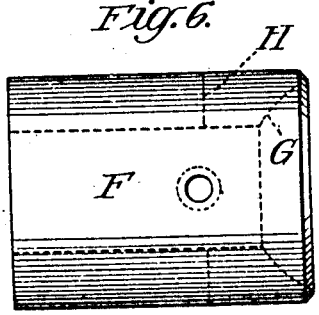
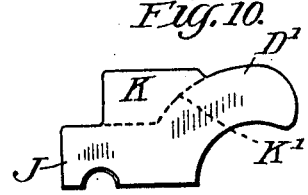
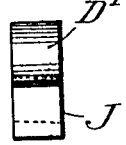
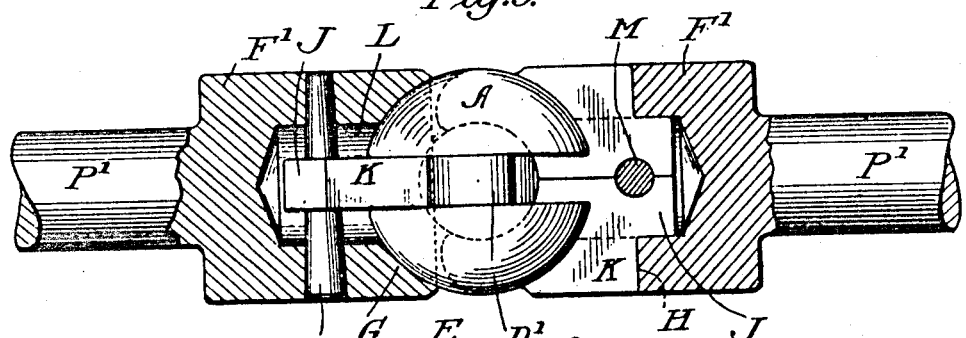

UNITED STATES PATENT OFFICE.

JAMES A. EDEN, JR., OF SPRINGFIELD, MASSACHUSETTS, ASSIGNOR TO BAUSCH MACHINE TOOL COMPANY, A CORPORATION OF MASSACHUSETTS.

UNIVERSAL JOINT.

1,177,766.  Specification of Letters Patent.  Patented Apr. 4, 1916.

Application filed January 8, 1914. Serial No. 810,954.

*To all whom it may concern:*

Be it known that I, JAMES A. EDEN, Jr., a citizen of the United States, residing in Springfield, Massachusetts, have invented certain new and useful Improvements in Universal Joints, of which the following is a specification.

This invention aims to provide certain improvements in universal joints whereby a very strong and smooth running joint is provided and one which is cheap to manufacture.

The accompanying drawings illustrate embodiments of the invention.

Figure 1:
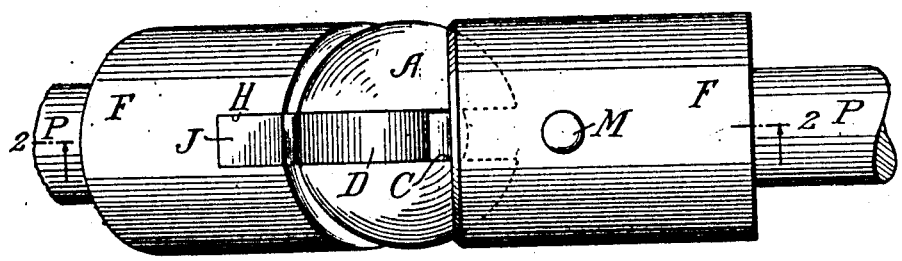
Figure 2:
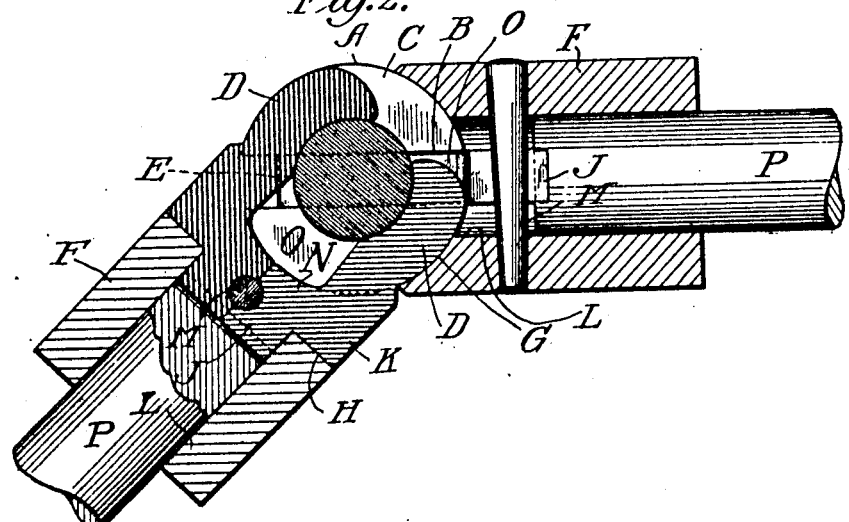
Figure 3:
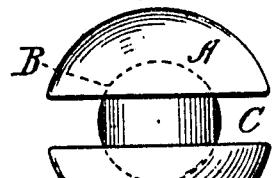
Figure 4:
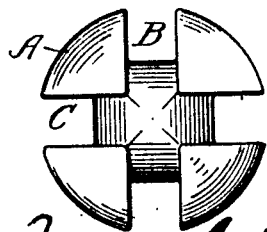

Figures 1 and 2 are respectively a plan and a section on the line 2—2 of a complete assembled joint embodying the invention. Fig. 3 is a plan of the ball and Fig. 4 an end view of the same. Figs. 5 and 6 are respectively a plan and side view of one of the hubs. Figs. 7 and 8 are respectively a side and an end elevation of one of the blades of the joint shown in Figs. 1 and 2. Fig. 9 is a horizontal section of a slightly modified style of joint embodying the invention. Figs. 10 and 11 are respectively a side and an end elevation of one of the blades of Fig. 9.

Referring now to the embodiments of the invention illustrated, the ball A is provided with intersecting circumferential grooves B and C, preferably of rectangular cross-section in which are engaged two pairs of blades, the blades D of one pair being engaged in the groove C and the blades E of the other pair being engaged in the groove B. The two blades D are separately formed and are carried by a hub F which is fastened to one section of the shaft in any usual or suitable way, the blades E of the other set being similarly carried by the opposite hub F adapted to be fastened to the next section of the shaft. Each hub has an end formed with a socket G reamed out with a ball reamer so as to fit and cover a portion of the ball and portions of said grooves and is slotted across with a milling cut to form a slot H extending through from one side to the other and of the same width as the blades. The blades are provided with stems J and intermediate portions K; the latter fitting in the slots H and the stems J when placed together in the manner shown in Fig. 2, making a close fit in the bore L of the hollow hub. Each pair of blades is fastened in a hub by means of a taper pin M passing through suitable holes in the hub and through the semi-circular notches provided in the stems J of the blades.

By socketing the ends of the hubs so that they extend over portions of the ball and supporting the blades in the slots of the hubs, each blade is supported by its hub right up to the periphery of the ball. The blades of each pair are made separately as shown in order to hook over the ball to a sufficient distance to hold each hub and pair of blades to the ball and thus to hold the two parts of the joint together. This makes a very strong and smooth running joint; it is also cheap to manufacture, as it is very desirable to have the wearing parts of hard steel and it is only necessary in this construction to use a high grade of steel for the ball and the blades; the hubs, which constitute the larger portion can be of a less expensive stock.

In Figs. 7 and 10 I have indicated by the dotted lines K' the position of the end of the hub. This is the line of contact between the concave end of the hub and the convex face of the ball. There is practically no space between the two except enough for easy movement and thus there is no bending strain upon the blades but only the shearing strain along the line K'. Since the portion K of the blade extends clear out to the periphery of the hub the line K' is as long as practicably possible so as to provide the greatest practicable resistance to the shearing strain.

The blades are flat as shown in Figs. 8 and 11 and the work of shaping them is simple milling work so that they can be made readily and cheaply.

When the joint is assembled as in Figs. 1 and 2 it is a simple matter to insert the shaft sections P into the hubs and fasten them there by welding, keying or otherwise. Preferably the shaft sections are notched as shown in Fig. 2 to engage the stems J of the blades. The strain from the shafts is transmitted to the blades through the hubs F and the latter are made sufficiently thick to carry the strain and to distribute it over considerable portions of the blades.

The torsional force exerted on the hub F is transmitted to the blades transversely by the engagement of the portions K thereof with the side walls of the slots H, but also to some extent through the pin M. The notch in the end of each shaft section as shown in Fig. 2 is fitted over the ends of the blades J where the latter are made of the rectangular section shown, but this engagement is not depended upon to transmit torsional strains to the blades, and will not ordinarily transmit any substantial strain. The principal purpose of this construction is to permit the insertion of the shaft section T for a considerable length into a comparatively short hub F to which it is afterward welded or otherwise fastened; and the notched end of the shaft section under these circumstances has to pass freely over the ends of the blades, so that there will be no such rigid engagement as that between the shaft section and the hub on the one hand or that between the hub and the blades on the other hand. Substantially all the torsional strain will, therefore, be transmitted from the shaft section directly to the hub and from the latter directly to the blades.

The joint of Figs. 1 and 2 is intended as a complete article of manufacture independently of the shaft sections. The same principle, however, may be applied, as in Fig. 9, where the hubs F' are made integral parts of the shaft sections P'.

To secure as great angularity as possible and to get as long a hook over the ball the blades are preferably made in the form indicated in Figs. 2 and 7 with notches N which, when they are held together, form openings O, Fig. 2, through or into which the ends of the opposite pair of blades may pass when the hubs or sections of the shaft stand at the greatest angle to each other. The blades of each pair, however, may be of the shape shown in Figs. 9, 10 and 11, making a continuous engagement with the groove of the ball from the end of one blade clear around to the end of the other. These blades D' and E' must be made shorter than the blades of the notched type shown in Fig. 7 since the ends of the blades cannot pass into the intersection of the grooves or ball, such intersection being always occupied by the central portion of the opposite pair of blades. In either case the radial depth of the blades is such that their ends pass freely into the portions of the grooves which are covered by the opposite hub when there is any substantial angular movement.

Though I have described with great particularity of detail certain specific embodiments of my invention, yet it is not to be understood therefrom that the invention is restricted to the particular embodiments disclosed. For example, a single hub with its pair of blades of the style shown may be used, the opposite section of the shaft being connected in any usual or suitable way, and various other features of invention may be used separately and the invention may be modified in detail and in the arrangement of the parts by those skilled in the art without departing from the invention.

What I claim is:

1. A universal joint including in combination a shaft section, a ball with a circumferential groove, a hub made of a single piece of metal mounted on said shaft section, said hub having a central bore, and a pair of blades engaged in said groove and having stems which enter the central bore of said hub and are fastened therein, said blades having torsion-transmitting engagement with said hub at only such portions of the length thereof as are beyond the shaft section so that the entire torsional strain from the shaft is transmitted to the blades through the hub, the hub being made sufficiently thick to carry such strain and to distribute it over considerable portions of the blades.

2. A universal joint including in combination a shaft section, a ball with a circumferential groove, a hub on said shaft section, said hub being hollow and having a slot across the end and a pair of blades engaged in said groove having portions fitting in said slot and having stems which enter and are fastened in the hollow of said hub.

3. A universal joint including in combination a shaft section, a ball with a circumferential groove, a hub made of a single piece of metal mounted on said shaft section, said hub having a central bore, and a pair of blades engaged in said groove and having stems which enter the central bore of said hub and are fastened therein, the blades having a torsion-transmitting engagement with the hub only so that substantially the entire torsional strain from the shaft is transmitted to the blades through the hub, said hub being made sufficiently thick to carry such strain and to distribute it over considerable portions of the blades.

4. A universal joint comprising shaft sections, a ball with intersecting circumferential grooves, hubs carried by said shaft sections and having their ends socketed and fitting the surface of said ball and covering portions of said grooves, said hubs being hollow and having each a slot across its end and two pairs of blades, one pair being engaged in each of said grooves having portions fitting in the slots of said hubs and having stems which enter and are fastened in the hollows of said hubs.

In witness whereof, I have hereunto signed my name in the presence of two subscribing witnesses.

JAMES A. EDEN, Jr.

Witnesses:
D. ANTHONY USINA,
LULU STUBENVOLL.